United States Patent [19]

Shimizu et al.

[11] 4,395,443

[45] Jul. 26, 1983

[54] METHOD OF FORMING SILICONE FILMS

[75] Inventors: Chiyuki Shimizu; Kiyoshi Hosokowa, both of Ohta, Japan

[73] Assignee: Toshiba Silicones, Ltd., Japan

[21] Appl. No.: 262,272

[22] Filed: May 7, 1981

[30] Foreign Application Priority Data

May 9, 1980 [JP] Japan .................................. 55-61502

[51] Int. Cl.$^3$ ............................................... A23F 3/00
[52] U.S. Cl. .................. 427/387; 427/393.5; 524/261; 524/267; 524/490; 528/15; 528/17; 528/18; 528/21
[58] Field of Search ....................... 524/261, 267, 490; 427/387, 393.5; 528/15, 17, 18, 21

[56] References Cited

U.S. PATENT DOCUMENTS 4,229,548 10/1980 Sattkegger et al. ................... 528/33
4,257,932 3/1981 Beers ..................................... 528/33

Primary Examiner—Melvyn I. Marquis

[57] ABSTRACT

There is provided a silicone film-forming composition and method for forming dust-resistant films from such compositions which are comprised of a condensation product of a benzene soluble polysiloxane and a silanol terminated polydiorganosiloxane in combination with a mixed solvent comprised of a volatile organosilicon compound and a hydrocarbon solvent.

16 Claims, No Drawings

METHOD OF FORMING SILICONE FILMS

This patent application claims priority over Japanese Patent Application 61502/80 filed May 9, 1980.

FIELD OF THE INVENTION

The present invention relates to a method of forming a dust-resistant film on the surface of a silicone elastomer, especially silicone elastomers formed by curing at room temperature.

BACKGROUND OF THE INVENTION

Various polyorganosiloxane compositions which are cured at room temperature to form elastomers are known.

For example, compositions comprising a polydiorganosiloxane having both terminals end-blocked with silanol groups, and a crosslinking agent comprised of an organic silicon compound having a hydrolyzable group bonded to the silicon atom, such as an acetoxy group, an alkoxy group, a dialkylketoxime group, a dialkylamino group, a dialkylaminoxy group or an N-methylamido group, are widely used in the construction industry, the automobile industry, the electric machinery industry and other industries. In the construction industry, these compositions are used for forming waterproof seals in spaces of walling materials such as concrete walls and aluminum plates, fixing glass sheets to sashes, and bonding glass sheets to one another. Such compositions are generally called silicone sealants. They exhibit excellent weatherability, durability, heat resistance and cold resistance, and experience only small changes in physical properties as the temperature changes, and they are not degraded by ozone or ultraviolet rays. Moreover, they have good workability in the application operation. By virtue of these characteristic properties, market demands for these silicone sealants have prominently increased in the field of construction of multi-storied buildings as well as in other fields. Moreover, these compositions have been recently used as coating materials. More specifically, a crosslinkable polyorganosiloxane of this type may be coated on a roof or wall surface in order to form a silicone elastomer layer.

Although such silicone elastomers have the above-mentioned excellent properties, they still retain a certain stickiness upon completion of the curing reaction. Furthermore, since the polydiorganosiloxane, which is the main component, is a dielectric substance, the silicone elastomer tends to attract dust. but the elastomer surface is markedly stained by the attracted dust, especially when a non-reactive polydiorganosiloxane is also added so as to obtain a silicone elastomer having suitable softness while retaining suitable operation workability. Furthermore, since the polysiloxanes which do not participate in the crosslinking reaction may tend to ooze out to the surface and contact the attracted dust, and the dust is rendered water-repellant, and will therefore not be washed away by rain water. Thus, the appearance may be drastically degraded by such dust.

We have previously found that a method of making a surface active agent co-present in a polyorganosiloxane composition that can be cured into an elastomer which is effective for preventing the above-described contamination (Japanese Patent Application No. 153148/79). This method is advantageous since a contamination-preventing agent is incorporated in a sealant, and the number of working steps need not be increased. Even when the joint width considerably changes, sealing can be effected appropriately despite such change of the joint width. However, the mechanical properties and adhesion of the sealant are reduced when it is impregnated with water. In order to eliminate this disadvantage, it is necessary to use an inorganic filler having a hydrophobic surface.

We then found that a dust-resistant film is effectively formed by a method comprising coating on the surface of a silicone elastomer such as mentioned above, a composition formed by dissolving a benzene-soluble polyorganosiloxane resin containing trifunctional or tetrafunctional siloxane units in which the molar ratio of the organic group to the silicon atom in the molecule is lower than 2, into a mixed solvent of a hydrocarbon solvent and a volatile silane or siloxane, and drying and curing the coated composition (Japanese Patent Application No. 173443/79). This method is advantageous in that a uniform film having high dust resistance can be formed on the surface of a silicone elastomer. However, the film obtained according to this method has unsatisfactory softness and toughness. Accordingly, if the sealing composition is applied to a place where stress is easily caused by vibrations of a base or expansion or shrinkage of the base by changes of temperatures, for example, if the composition is used for sealing joints of a multi-storied building or coating the surface of a construction, cracks are readily formed in the film and the appearance is drastically degraded by contamination of the cracked portions.

Research was directed toward developing a method capable of solving the above-mentioned problems and we have completed the present invention which addresses these problems.

DESCRIPTION OF THE INVENTION

More specifically, in accordance with the present invention, there is provided a method of forming dust-resistant films which is comprised of coating on the surface of a silicone elastomer a composition formed by dissolving (1) a condensation reaction product between (A) 100 parts by weight of a benzene-soluble polyorganosiloxane consisting essentially of $SiO_2$ units and $R_3^1SiO_{\frac{1}{2}}$ units, in which groups $R^1$, which may be the same or different, stand for a substituted or unsubstituted monovalent hydrocarbon group, wherein the amount of the $R_3^1SiO_{\frac{1}{2}}$ units is 0.4 to 1.0 mole per mole of the $SiO_2$ units and a reactive group selected from a group consisting of hydroxyl and alkoxy groups is bonded to the silicone atom in a number of 0.0004 to 1 per silicon atom, and (B) 20 to 200 parts by weight of a silanol-terminated polydiorganosiloxane having a viscosity of 10,000 to 2,000,000 cSt as measured at 25° C., in (2) a mixed solvent comprising (a) a volatile organosilicon compound having a boiling point of 70° to 250° C. as measured under atmospheric pressure and being represented by the molecular formula:

$R_4^2Si$;
$R_3^3SiO[R_2^4SiO]_mSiR_3^3$;
$R^5Si[OSiR_3^6]_3$ or,
$[R_2^7SiO]_n$, in which $R^2$ through $R^7$, which may be the same or different, stand for a hydrogen atom or an alkyl group, m is zero or a positive number and n is a positive number, and (b) a hydrocarbon solvent, the amount of the volatile organosilicon compound (a) being at least 5% by weight based on the total amount of the organosilicon compound (a) and the hydrocarbon solvent (b), and drying and curing the coated composition.

The component (1) used in the present invention is obtained by condensing the benzene-soluble polyorganosiloxane (A) with the silanol-terminated polyorganosiloxane (B). It is preferred that the amount of the component (1) be 5 to 80% by weight, especially 10 to 50% by weight, based on the total amount of the components (1) and (2). If the amount of the component (1) is too small, the thickness of the film formed by one coating operation is thin, and therefore, the coating operation should be repeated several times. This repeated coating is very troublesome when the composition is applied to a construction. If the amount of the component (1) is too large, the viscosity is increased and handling becomes difficult, and a smooth film is hard to obtain.

The benzene-soluble polyorganosiloxane (A) is comprised of $SiO_2$ units and $R_3^1SiO_{\frac{1}{2}}$ units (in which $R^1$ is as defined above), and it has a relatively low molecular weight. $R^1$ represents, for example, alkyl groups such as methyl, ethyl, propyl, butyl, amyl, hexyl, octyl and decyl groups, alkenyl groups such as a vinyl group, aralkyl groups such as a beta-phenylethyl group, aryl groups such as a phenyl group, and substituted hydrocarbon groups having some hydrogen atoms substituted with a chlorine atom, a fluorine atom, a nitrile group or the like. From the viewpoints of ease of synthesis, weatherresistance and reactivity with the component (B), it is preferred that at least 90 mole % of the $R^1$ groups are methyl groups, and it is especially preferred that all of the $R^1$ groups are methyl groups. The amount of the $R_3^1SiO_{\frac{1}{2}}$ units is 0.4 to 1.0 mole per mole of the $SiO_2$ units. If the amount of the $R_3^1SiO_{\frac{1}{2}}$ units is too small, it is hard to obtain a stable benzene-soluble product having a low molecular weight and gelation is readily caused during synthesis, resulting in formation of an insoluble and infusible polymer. If the amount of the $R_3^1SiO_{\frac{1}{2}}$ units is too large, the condensation reactivity with the silanol-terminated polydiorganosiloxane is reduced, and a composition capable of providing a film having a sufficient dust-resistant effect while also exhibiting excellent toughness is difficult to obtain.

It is indispensable that the benzene-soluble polyorganosiloxane (A) should contain a reactive group bonded to the silicon atom in an amount of 0.0004 to 1 per silicon atom. As the reactive group, there can be mentioned, for example, a hydroxyl group and an alkoxy group.

Such a polysiloxane is prepared by co-hydrolyzing a tetra-functional silicon-containing compound selected from an alkyl silicate such as ethyl silicate or propyl silicate, a partial condensation product thereof, silicon tetra-chloride and water glass with a triorganochlorosilane such as trimethylchlorosilane, dimethylvinylchlorosilane or dimethylphenylchlorosilane in the presence of a solvent and removing by-products by customary means. As the solvent, there are ordinarily used hydrocarbons such as benzene, toluene, xylene, gasoline, n-hexane and n-heptane.

Among the silanol-terminated polydiorganosiloxanes (B), there may be used one having a substantially linear siloxane linkage and a viscosity of 10,000 to 2,000,000 cSt as measured at 25° C. If the viscosity is lower than 10,000 cSt, the cured film has poor toughness or softness, and if the viscosity exceeds 2,000,000 cSt, the viscosity of the composition is increased and the operation workability is degraded. Organic groups exemplified above with reference to $R^1$ of the component (A) can be utilized as the organic group bonded to the silicon atom. A methyl group is most preferred as the organic group, because a good balance is obtained between the viscosity of the composition and the required physical properties. The condensation reactivity with the polysiloxane (A) is also good, and the intermediate can easily be obtained on an industrial scale. The room temperature curing speed, which is required when heating is difficult (for example, on formation of a dust-resistant film on a joint sealant or a surface coating material in a construction) is very high and the resultant film has excellent ultraviolet ray resistance. Although it is preferred that all of the organic groups be methyl groups, up to 20 mole % may be phenyl groups or up to 10 mole % may be vinyl groups according to the intended use or required properties.

Condensation of the polysiloxane (A) with the silanol-terminated polydiorganosiloxane (B) is accomplished by mixing both the components and heating the mixture, preferably in the presence of potassium hydroxide or sodium hydroxide or an organic peroxide. The polysiloxane (A) is ordinarily obtained in the form of a hydrocarbon solution having a solid content of 30 to 60% by weight, and a solvent may further be added as necessary. The silanol-terminated polydiorganosiloxane (B) is added to the above solution, and the mixture is heated. A hydrocarbon solvent is suitable as the solvent, and toluene or xylene are especially preferred. The heating temperature is preferably in the range of from 80° to 150° C. From the viewpoint of control of the temperature, it is preferred that heating be conducted at the reflux temperature of the solvent. The condensation reaction need not be conducted until the reaction is completed, but the reaction may be stopped when the components (A) and (B) are formed into a homogeneous transparent solution.

The mixed solvent (2) used in the present invention comprises (a) a volatile organosilicon compound and (b) a hydrocarbon solvent, and this component is necessary for imparting good wettability to the surface of a resulting silicone elastomer and for coating the composition uniformly.

The volatile organosilicon compound (a) is a silane or siloxane free of an unstable group, but the presence of a hydrogen atom bonded to the silicon atom is permissible. It is indispensable that the organosilicon compound (a) should have an appropriate volatility. If the boiling point is too low, the compound (a) is evaporated too promptly and no effect is attained, and if the boiling point is too high, the drying property is degraded and formation of a film is delayed. As the component (a), there can be included, for example, silanes such as triethylsilane, dimethyldiethylsilane and trimethylbutylsilane, linear siloxanes such as hexamethyldisiloxane, octamethyltrisiloxane, decamethyltetrasiloxane and dodecamethylpentasiloxane, branched siloxanes such as 3-trimethylsiloxy-1,1,1,3,7,7,7-heptamethyltrisiloxane, and cyclic siloxanes such as hexamethylcyclotetrasiloxane, octamethylcyclotetrasiloxane, decametylcyclopentasiloxane and 1-ethyl-3,3,5,5,7,7,-hexamethylcyclotetrasiloxane. From the viewpoint of ease of synthesis, methyl siloxanes are preferred, and from the viewpoint of good balance between ease of synthesis and volatility, octamethylcyclotetrasiloxane is especially preferred. It is indispensable that the amount of the component (a) should be at least 5% by weight, preferably at least 10% by weight, based on the total amount of the components (a) and (b). If the amount of the component (a) is too small, good wettability with the surface of a silicone elastomer is not obtained, and a repellent or uneven coating is caused and a uniform film is not formed.

As the hydrocarbon solvent (b), there can be mentioned, for example, benzene, toluene, xylene, n-hexane, n-heptane, cyclohexane and gasoline. From the viewpoints of appropriate volatility, solubility of the condensation product (1) and ease of handling, an aromatic solvent such as toluene or xylene is preferred.

When the degree of condensation of the condensation product (1) is high, a dust-resistant film excellent in toughness and softness is obtained by coating the resulting composition directly on the surface of a silicone elastomer.

When the condensation product (1) is used in the form of a partial condensation product having a residual hydroxy group bonded to the silicon atom, it is possible to adopt a method in which at the coating step, a curing catalyst and/or an organosiloxane having at least two hydrolyzable groups bonded to the silicon atom in the molecule is added to complete the condensation reaction. As the curing agent, there can be included, for example, organic acid salts of metals such as tin, alkyl titanates, titanium chelate compounds, nickel chelate compounds, cobalt chelate compounds and amine compounds. As the hydrolyzable group, there can be included, for example, alkoxy groups such as methoxy, ethoxy and propoxy groups, acyloxy groups such as an acetoxy group, organoaminoxy groups such as diethylaminoxy groups, and oxime groups such as acetoxime and methylethylketoxime groups. If such hydrolyzable silanes or siloxanes are used in combination with a curing catalyst such as mentioned above, the condensation reaction is promoted. Incidentally, gamma-aminopropyltriethoxysilane is a hydrolyzable silane acting also as the curing catalyst, and if it is used in combination with an organosilane or organosiloxane having a diethylaminoxy group a good curing property is attained with a high curing speed.

A powder of silica, titanium oxide, calcium carbonate or carbon black may be added to attain coloring, delustering and reinforcing effects.

In the present invention, the condensation product (1) is dissolved in the mixed solvent (2) of the components (a) and (b), a curing catalyst and/or a hydrolyzable silane or siloxane is added to the composition as needed, the resulting composition is coated on a silicone elastomer, and the components (a) and (b) of the mixed solvent (2) are evaporated to form a cured film of the condensation product (1) having excellent dust-resistance, toughness and softness on the surface of the silicone elastomer. Either a room temperature curing silicone elastomer or a heat curing silicone elastomer may be used as the silicone elastomer in the present invention. Especially good results are obtained when the present invention is applied to construction sealants and coating materials where contamination with dust is a serious problem, and in this case, high contamination-prevention can be attained advantageously.

Coating is accomplished by optional coating methods such as brush coating, roll coating and spray coating.

Since the film obtained according to the present invention has excellent toughness and softness, even if the composition is coated on a sealant for construction joints where the area and shape may be changed by temperature, wind pressures or earthquakes, or on a coating on a metal plate or roof, where the area and shape are readily changed by temperature changes, the film can compensate for these changes and therefore the formation of cracks can be mode-rated to a significant degree.

The present invention will now be described in detail with reference to the following examples. In the examples, all "parts" are by weight. For simplification of the description, the following abbreviations are used.

Me: methyl group
Et: ethyl group
Bu: butyl group
Ph: phenyl group
M: trimethylsiloxane unit (Me$_3$SiO$_{\frac{1}{2}}$)
D: dimethylsiloxane unit (Me$_2$SiO)
T: monomethylsiloxane unit (MeSiO$_{3/2}$)
Q: SiO$_2$ unit
D$^f$: diphenylsiloxane unit (Ph$_2$SiO)
T$^f$: monophenylsiloxane unit (PhSiO$_{3/2}$)

EXAMPLE 1

200 parts of a 50% toluene solution of a resinous copolymer composed of Q and M units and having a hydroxyl group bonded to the silicon atom, in which the amount of the M units was 0.65 mole per mole of the Q units, was mixed with 100 parts of silanol-terminated polydimethylsiloxane having a viscosity of about 500,000 cSt as measured at 25° C., and 0.006 part of sodium hydroxide was added to the mixture and condensation was carried out by heating and stirring under reflux of toluene until the viscosity of the reaction mixture was increased to 100,000 cSt. The reaction mixture was neutralized and filtered and toluene was added to adjust the solid content to 50%, whereby a condensation product (hereinafter referred to as "S-1") was obtained. Then, D$_4$ was added in an amount shown in Table 1 and toluene was further added to form samples 11 through 15. Incidentally, sample 11 was a comparative sample.

A base compound was obtained by kneading 100 parts of heavy calcium carbonate with 100 parts of silanol-terminated polydimethylsiloxane having a viscosity of 5,000 cSt as measured at 25° C. by a kneader, and an uncured silicone sealant was prepared by incorporating 3.0 parts of a crosslinking agent mixture comprising 94% by weight of

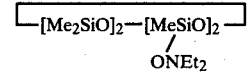

and 6% by weight of

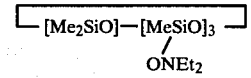

into the base compound. The sealant was molded into a sheet having a thickness of about 2 mm and allowed to stand at room temperature for 3 days to obtain a cured elastomer sheet. The samples 11 through 15 were each coated on the so obtained sheet by a coating brush and the degree of wetting was examined. The coated samples were dried and cured, and the so formed test pieces were exposed outdoors and the degree of staining was examined. The results are shown in Table 1.

TABLE 1

| | Sample No. | | | | |
|---|---|---|---|---|---|
| | 11 (comparison) | 12 | 13 | 14 | 15 |
| Composition (parts) | | | | | |
| S-1 | 100 | 100 | 100 | 100 | 100 |
| D4 | — | 12.5 | 25 | 50 | 100 |
| Toluene | 100 | 87.5 | 75 | 50 | — |
| 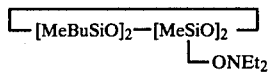 [Me₂SiO]—[MeSiO]₃ — ONEt₂ * | — | 1 | 1 | 1 | 1 |
| Wettability | X | C | B | B | A |
| Exposure Test | | | | | |
| 30 days | B | A | A | A | A |
| 60 days | (X) | A | A | A | A |
| 120 days | (X) | A | A | A | A |
| 180 days | (X) | B | A | A | A |

Note
*: Mixed just prior to application
Meanings of symbols are as follows and remain the same in the subsequent tables:
Wettability:
"A": Very good
"B": Good
"C": Slightly repelling
"X": Repelling
Exposure Test:
"A": No staining
"B": Slight staining
"X": Staining
"XX": Extreme staining
"()": Because of poor wettability of the composition, composition-adhering and non-adhering portions were formed. Although the adhering portions were not stained, it was found that the non-adhering poritions were stained.

EXAMPLE 2

Samples 21 through 24 shown in Table 2 were prepared by incorporating various organosilicon compounds into S-1 used in Example 1. Each of the samples was coated on the surface of the silicone elastomer used in Example 1 by a coating brush, and the tests were conducted in the same manner as described in Example 1. The obtained results are shown in Table 2.

TABLE 2

| | Sample No. | | | |
|---|---|---|---|---|
| | 21 | 22 | 23 | 24 |
| Composition (parts) | | | | |
| S-1 | 100 | 100 | 100 | 100 |
| Et₃SiH | 100 | — | — | — |
| MM | — | 100 | — | — |
| MD₂M | — | — | 100 | — |
| D₃, D₄, D₅ mixture* | — | — | — | 100 |
| gamma-aminopropyltriethoxysilane** | 1 | 1 | 1 | 1 |
| Wettability: | B | A | A | A |
| Exposure Test | | | | |
| 30 days | A | A | A | A |
| 60 days | A | A | A | A |
| 120 days | A | A | A | A |
| 180 days | A | A | A | A |

Note
*Mixture comprising 10% by weight of D₃, 70% by weight of D₄ and 20% by weight of D₅
**Added just before application

EXAMPLE 3

A base compound was prepared by kneading 65 parts of stearic acid-treated calcium carbonate with 100 parts by weight of silanol-terminated polydimethylsiloxane having a viscosity of 3,000 cSt as measured at 25° C. by a kneader. Then, a crosslinking agent mixture comprising 95% by weight of:

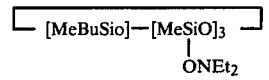
[MeBuSiO]₂—[MeSiO]₂—ONEt₂ and 7% by weight of:

[MeBuSio]—[MeSiO]₃
         |
         ONEt₂ was added to the base compound, and 100% by weight of xylene was added to the mixture to form a liquid composition. The composition was coated on the surface of a soft steel plate having a length of 10 mm, a width of 10 mm and a thickness of 1 mm by a brush, and the coated composition was cured and aged at room temperature for 7 days to form a coating having a thickness of about 0.4 mm. The sample 15 prepared in Example 1 and samples 31 through 33 prepared according to recipes shown in Table 3 were brush-coated on the surface of the so obtained silicone elastomer coating material, and the coatings were cured at room temperature to obtain test pieces. Polysiloxane solutions used, other than S-1, are as follows:

S-2: A 60% xylene solution of a polysiloxane consisting of M units and Q units and having a hydroxyl group bonded to the silicon atom, in which the amount of the M units is 0.8 mole per mole of the Q units.

S-3: A 50% xylene solution of a polysiloxane consisting of T units and D units at a molar T to D ratio of 5 to 4 respectively and having a hydroxyl group bonded to the silicon atom. S-4: A 50% xylene solution of a polysiloxane consisting of T units, D units, T′ units and D′ units at a molar ratio of 2 to 7 to 6 to 3 respectively, and having a hydroxyl group bonded to the silicon atom.

The samples 31 through 33 were comparative samples, and the test piece not treated with the polysiloxane solution was also tested as another comparative sample. The test pieces were subjected to the Erichsen test, and presence or absence of cracks was checked. Furthermore, the test pieces were exposed outdoors and the state of staining was observed.

The results are shown in Table 3.

The thickness of the silicone elastomer coating material was changed to 0.15 mm, and the sample 15 and the comparative sample 31 were coated thereon and cured at room temperature to form thin layer test pieces. When the base compound was prepared in the above-mentioned manner, 1 part of carbon black was added, and the above-mentioned procedures were repeated to form a black silicone elastic coating material layer having a thickness of about 0.4 mm. Then, the sample 15 and comparative samples 31 through 33 were coated on the coating material layer to obtain colored test pieces. These thin layer and colored test pieces were subjected to the Erichsen test and the exposure test under the same conditions as described above. At the Erichsen test, no change was caused in the test piece coated with the sample 15, but cracks were formed in other test pieces. The results of the exposure test are shown in Table 3. Samples No. 31, 32, and 33 are comparisons.

TABLE 3

|  | Untreated | Sample No. 15 | 31 | 32 | 33 |
|---|---|---|---|---|---|
| Composition (parts) | | | | | |
| S-2 | — | | 100 | — | — |
| S-3 | — | (See | — | 100 | — |
| S-4 | — | Table 1) | — | — | 100 |
| MD$_2$M | — | | 100 | 100 | 100 |
| ⌐[Me$_2$Sio]—[MeSiO]$_3$┐<br>└—ONEt$_2$ | — | | 1 | 1 | 1 |
| Wettability | — | A | A | A | A |
| Erichsen Test | | | | | |
|   Deformation 5 mm | — | No change | Cracked | Cracked | Cracked |
|   Deformation 10 mm | — | No change | Cracked | Cracked | Cracked |
| Exposure Test | | | | | |
|   30 days | B | A | A | A | A |
|   60 days | X | A | A | A | A |
|   120 days | XX | A | A | A | A |
|   180 days | XX | A | A | A | A |
| Exposure Test of Thin Layer Test Piece | | | | | |
|   30 days | | A | A | | |
|   60 days | | A | A | | |
|   120 days | | A | (B) | | |
|   180 days | | A | (X) | | |
| Exposure Test of Colored Test Piece | | | | | |
|   30 days | | A | A | A | A |
|   60 days | | A | (B) | (X) | (B) |
|   120 days | | A | (X) | (X) | (B) |
|   180 days | | A | (X) | (X) | (X) |

Note:
(): The polysiloxane resin film was cracked and the cracked portion was stained.

EXAMPLE 4

100 parts of silanol-terminated polydimethylsiloxane having a viscosity of 20,000 cSt as measured at 25° C. was mixed with 10 parts of fumed silica surface-treated with octamethylcyclotetrasiloxane and 1 part of granular carbon black by a kneader to obtain a black base compound. Then, 0.5 part of dibutyl tin laurate and 4 parts of methyltris(butanoneoxime) silane were added in sequence to the base compound and the composition was blended while insulated from moisture. Then, 100 parts of kerosene were added to form a solution, and the solution was roll-coated on the surface of a mild steel plate having a length of 1,000 mm, a width of 1,000 mm and a thickness of 2 mm and cured and aged at room temperature for 7 days. When the thickness of the obtained silicone elastomer coating was measured, it was found that the thickness was about 0.2 mm. Samples 41 through 44 shown in Table 4 were spray-coated on the above-said silicone elastomer surface and dried and cured at room temperature to obtain test pieces. In order to increase the ratio of receipt of sun light, these test pieces were placed toward the south at an angle of 35° from the horizontal plane, and in this state, they were subjected to the exposure test.

The sample 44 was a comparative sample. A test piece not treated with the polysiloxane solution was also tested as another comparative test piece. The results of the exposure test are shown in Table 4. The polysiloxane solutions used are shown below.

S-5: A 60% toluene solution of a polysiloxane prepared from 200 parts of a 50% toluene solution of a resinous copolymer consisting of Q units and M units and having a hydroxyl group bonded to the silicon atom, in which the amount of the M units was 0.55 mole per mole of the Q units, and 50 parts of silanol-terminated polydimethylsiloxane having a viscosity of about 70,000 cSt as measured at 25° C. in the same manner as described above with reference to S-1.

S-7: A 50% xylene solution of a polysiloxane prepared from 100 parts of a 50% xylene solution, a polysiloxane consisting of Q units and M units and having a hydroxyl group bonded to the silicon atom, in which the amount of the M units was 0.53 mole per mole of the Q units, and 80 parts of silanol-terminated polydimethylsiloxane having a viscosity of 1,000,000 cSt as measured at 25° C. in the same manner as described above with reference to S-1.

S-8: A 50% toluene solution of a polysiloxane having methoxy group bonded to the silicon atom, which was obtained by partially methoxylating methyltrichlorosilane and hydrolyzing and condensing the partial methoxylation product.

TABLE 4

|  | Untreated (Comparison) | Sample No. 41 | 42 | 43 | 44 |
|---|---|---|---|---|---|
| Composition (parts) | | | | | |
| S-5 | | 100 | — | — | — |
| S-6 | | — | 100 | — | — |
| S-7 | | — | — | 100 | — |
| S-8 | | — | — | — | 100 |
| D$_4$ | | 100 | 100 | 100 | 100 |
| Gamma-aminopropyltriethoxysilane* | | 1 | 1 | 1 | 1 |
| Tin octoate (tin = 28%)* | | 0.1 | 0.1 | 0.1 | 0.1 |
| Exposure Test | | | | | |

TABLE 4-continued

| | Untreated (Comparison) | Sample No. | | | |
|---|---|---|---|---|---|
| | | 41 | 42 | 43 | 44 |
| 30 days | B | A | A | A | A |
| 60 days | (X) | A | A | A | A |
| 120 days | (XX) | A | A | A | (B) |
| 180 days | (XX) | A | A | A | (X) |

Note:
*: added just before application
(): cracks were formed on the polysiloxane resin film and the cracked portion was stained

EXAMPLE 5

65 parts of stearic acid-treated calcium carbonate was kneaded with 100 parts of silanol-terminated polydimethylsiloxane having a viscosity of 7,500 cSt as measured at 25° C. by a kneader to form a base compound. Then, 2.0 parts of a cross linking agent mixture comprising 91% by weight of

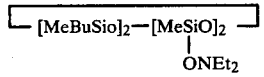

and 9% by weight of:

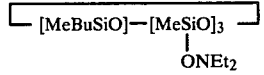

was incorporated into the base compound. The resulting composition was filled into a space of 12 mm between two concrete blocks having a size of 50 mm × 50 mm × 10 mm (thickness) to prepare an H-shaped test piece. The polysiloxane solutions of the samples 15, 31, 32 and 41 were coated and dried on the exposed surface of the silicone sealant in the H-shaped test piece to obtain test pieces 51, 52, 53 and 54. Incidentally, test pieces were treated by a repeated fatigue tester, and displacement of ±20% was given 2000 times to each test piece and the condition of the film was examined. The results are shown in Table 5. Test Piece No. 52 and 53 are comparisons.

TABLE 5

| Test Piece No. | 51 | 52 | 53 | 54 |
|---|---|---|---|---|
| Coating Sample No. | 15 | 31 | 32 | 41 |
| Polysiloxane Film after Repeated Fatigue Test | Not changed | Cracked | Cracked | Not changed |

EXAMPLE 6

A base compound was prepared by uniformly kneading 10 parts of fumed silica surface-treated with polydimethylsiloxane into 100 parts of silanol-terminated polydimethylsiloxane having a viscosity of 20,000 cSt as measured at 25° C. Then, 0.05 part of dibutyl tin diacetate and 5 parts of partially hydrolyzed methyltriacetoxysilane were added in sequence to the base compound, and the mixture was homogeneously kneaded while insulated from moisture. Then, 100 parts of xylene was added to the mixture to form a solution, and the solution was coated on an anti-corrosive aluminum plate and dried and cured.

Separately, 100 parts of S-1 used in Example 1 and S-6 used in Example 4 were dissolved in a liquid mixture of 60 parts of MD2M and 60 parts of toluene, and 1 part of gamma-(beta-aminoethyl)aminopropyltrimethoxysilane and 0.3 part of zinc octoate (zinc=6%) were added to the solution. Thus, there was obtained samples 61 and 62. The samples were coated and cured on the surface of the silicone elastomer layer formed on the surface of the aluminum plate to obtain test pieces. These test pieces were subjected to the Erichsen test with 10 mm deformation and the outdoor exposure test for 180 days. In each case, no change was observed on the film and the appearance free of contamination was maintained.

What is claimed as new and desired to be protected by Letters Patent:

1. A method of forming dust-resistant films which comprises coating on the surface of a silicone elastomer a composition formed by dissolving (1) a condensation reaction product between (A) 100 parts by weight of a benzene-soluble polyorganosiloxane consisting essentially of $SiO_2$ units and $R_3^1SiO_{\frac{1}{2}}$ units, in which groups $R^1$, which may be the same or different, stand for a substituted or unsubstituted monovalent hydrocarbon group, wherein the amount of the $R_3^1SiO_{\frac{1}{2}}$ units is 0.4 to 1.0 mole per mole of the $SiO_2$ units and a reactive group selected from hydroxyl and alkoxy groups is bonded to the silicon atom in an amount of 0.0004 to 1 per silicon atom; and (B) 20 to 200 parts by weight of a silanol-terminated polydiorganosiloxane having a viscosity of 10,000 to 2,000,000 cSt as measured at 25° C., in (2) a mixed solvent comprising (a) a volatile organosilicon compound having a boiling point of 70° to 250° C. as measured under atmospheric pressure and being represented by the molecular formula:

$R_4^2Si$,
$R_3^3SiO[R_2^4SiO]_m SiR_3^3$,
$R^5Si[OSiR_3^6]_3$ or
$[R_2^7SiO]_n$, in which $R^2$ through $R^7$, which may be the same or different, stand for a hydrogen atom or an alkyl group, m is 0 or a positive number and n is a positive number, and (b) a hydrocarbon solvent, the amount of the volatile organosilicon compound (a) being at least 5% by weight based on the total amount of the organosilicon compound (a) and the hydrocarbon solvent (b); and drying and curing the coated composition.

2. A method of forming films according to claim 1, wherein $R^1$ is a methyl group.

3. A method of forming film according to claim 1, wherein in the polydiorganodiloxane (B), the organic group bonded to the silicon atom is a methyl group.

4. A method of forming films according to claim 1, wherein each of the groups $R^2$ through $R^7$ in the volatile organosilicon compound (a) is a methyl group.

5. A method of forming films according to claim 1, wherein the hydrocarbon solvent (b) is an aromatic solvent selected from the group consisting of toluene and xylene.

6. A method of forming films according to claim 1, wherein the silicone elastomer is a silicone elastomeric coating material.

7. A method of forming films according to claim 1, wherein the silicone elastomer is a silicone sealant.

8. A method of forming films according to claim 1, wherein the condensation reaction product of (A) and (B) is a partial condensation product and wherein at the curing step a curing catalyst is incorporated into the composition to complete the condensation cure reaction.

9. A method of forming films according to claim 1, wherein the condensation reaction product of (A) and (B) is a partial condensation product and wherein at the curing step an organosilane or organosiloxane having at least two hydrolyzable groups bonded to the silicon atom in the molecule is incorporated into the composition to complete the condensation cure reaction.

10. A dust-resistant silicone film-forming composition comprising: (1) a condensation reaction product between (A) 100 parts by weight of a benzene-soluble polyorganosiloxane consisting essentially of $SiO_2$ units and $R^1_3SiO_{\frac{1}{2}}$ units, in which groups $R^1$, which may be the same or different, stand for a substituted or unsubstituted monovalent hydrocarbon group, wherein the amount of the $R^1_3SiO_{\frac{1}{2}}$ units is 0.4 to 1.0 mole per mole of the $SiO_2$ units and a reactive group selected from hydroxyl and alkoxy groups is bonded to the silicon atom in an amount of 0.0004 to 1 per silicon atom; and (B) 20 to 200 parts by weight of a silanol-terminated polydiorganosiloxane having a viscosity of 10,000 to 2,000,000 cSt as measured at 25° C., in (2) a mixed solvent comprising (a) a volatile organosilicon compound having a boiling point of 70° to 250° C. as measured under atmospheric pressure and being represented by the molecular formula:

$R^2_4Si$,
$R^3_3SiO[R^4_2SiO]_mSiR^3_3$,
$R^5Si[OSiR^6_3]_3$ or
$[R^7_2SiO]_n$, in which $R^2$ through $R^7$, which may be the same or different, stand for a hydrogen atom or an alkyl group, m is zero or a positive number and n is a positive number; and (b) a hydrocarbon solvent, the amount of the volatile organosilicon compound (a) being at least 5% by weight based on the total amount of the organosilicon compound (a) and the hydrocarbon solvent (b).

11. A composition according to claim 10 wherein $R^1$ is a methyl group.

12. A composition according to claim 10, wherein in the polydiorganodiloxane (B), the organic group bonded to the silicon atom is a methyl group.

13. A composition according to claim 10, wherein each of the groups $R^2$ through $R^7$ in the volatile organosilicon compound (a) is a methyl group.

14. A composition according to claim 10, wherein the hydrocarbon solvent (b) is an aromatic solvent selected from the group consisting of toluene and xylene.

15. A composition according to claim 10, wherein the condensation reaction product of (A) and (B) is a partial condensation product, further comprising a curing catalyst incorporated into the composition to complete the condensation cure reaction.

16. A composition according to claim 10, wherein the condensation reaction product of (A) and (B) is a partial condensation product, further comprising an organosilane or organosiloxane having at least two hydrolyzable groups bonded to the silicon atom in the molecule incorporated into the composition to complete the condensation cure reaction.

* * * * *